United States Patent [19]

Ireton

[11] Patent Number: 6,092,094
[45] Date of Patent: Jul. 18, 2000

[54] EXECUTE UNIT CONFIGURED TO SELECTABLY INTERPRET AN OPERAND AS MULTIPLE OPERANDS OR AS A SINGLE OPERAND

[75] Inventor: Mark A. Ireton, Austin, Tex.

[73] Assignee: Advanced Micro Devices, Inc., Sunnyvale, Calif.

[21] Appl. No.: 08/633,352

[22] Filed: Apr. 17, 1996

[51] Int. Cl.[7] ...................................................... G06F 7/38
[52] U.S. Cl. ............................................................ 708/706
[58] Field of Search ........................ 364/736.04, 748.19, 364/786.01, 787.01, 757; 395/898; 712/300; 708/503, 588, 706, 710, 625

[56] References Cited

U.S. PATENT DOCUMENTS

| 5,047,975 | 9/1991 | Patti et al. ............................... 708/706 |
| 5,189,636 | 2/1993 | Patti et al. ............................... 708/706 |
| 5,390,135 | 2/1995 | Lee et al. ................................. 708/518 |
| 5,432,728 | 7/1995 | Curtet ..................................... 708/710 |

FOREIGN PATENT DOCUMENTS

| 0 260 618 | 3/1988 | European Pat. Off. . |
| 0 654 733 | 5/1995 | European Pat. Off. . |
| 0 655 680 | 5/1995 | European Pat. Off. . |

OTHER PUBLICATIONS

Rosenberg; Dictionary of Computers, Information Processing & Telecom. 2nd Ed.; p. 26, 1987.
International Search Report for PCT/US 97/01184.
John L. Hennessy and David A. Patterson, "Computer Architecture A Quantitative Approach," 1990, pp. 572–576.
Dave Bursky, "Multimedia And Graphics ICs Bring Stellar Performance, Multimedia and Graphics Acceleration," Electronic Design, Nov. 6, 1995, pp. 88, 90, 96–98, 100, 102, and 104.

*Primary Examiner*—Kenneth Coulter
*Attorney, Agent, or Firm*—Conley, Rose & Tayon, PC; B. Noel Kivlin

[57] ABSTRACT

An execute unit including an integer operation circuit is provided. The integer operation circuit is dynamically configurable to operate upon many different widths of operands. A single pair of operands may be operated upon, wherein the width of the operands is the maximum width the integer operation circuit is configured to handle. Alternatively, multiple pairs of operands having narrower widths may be operated upon. The instruction being executed defines the width of the operands and therefore the number of operands. Wide operand operations are performed at a rate of one per instruction, and a rate of more than one instruction is achieved for narrow operands. The same integer operation circuitry is employed to perform both narrow and wide integer operations. Silicon area consumed by the integer operation circuitry may be reduced as compared to a wide integer operation circuit and multiple narrow integer operation circuits.

25 Claims, 10 Drawing Sheets

EXECUTE UNIT CONFIGURED TO SELECTABLY INTERPRET AN OPERAND AS MULTIPLE OPERANDS OR AS A SINGLE OPERAND

BACKGROUND OF THE INVENTION

1. Field of the Invention

This invention relates to the field of microprocessors and, more particularly, to integer operation circuits within microprocessors.

2. Description of the Relevant Art

Many modern microprocessors are configured to perform integer operations upon relatively wide operands. For example, 32 bit or even 64 bit operands are becoming common. The wide operand sizes allow for a high degree of accuracy in computations performed thereon. As used herein, an integer operation refers to a mathematical or logical operation performed upon an integer value or values. For example, addition, multiplication, and logical shifting are integer operations. The term operand refers to a value used as an input to an operation such as an integer operation. The operation operates upon the operands to produce a result (i.e. an addition operation may take two or more input operands, producing a result which is the sum of the operands).

An exemplary type of data which may require wide operand sizes for precise calculations is audio data. Compact-disk quality audio data may employ 32 bit operands for precision signal processing computations upon 16 bit audio samples. It is noted that 18–20 bits may be sufficient for performing audio data computations, but general purpose microprocessors are typically configured with arithmetic processing elements (e.g. adders, multipliers) which operate upon operands having a width in bits equal to a power of two.

Other types of data may require less precision. For example, video data is often manipulated in four or eight bit quantities. A particular pixel may be represented as four or eight bits of red color intensity, four or eight bits of green color intensity, and four or eight bits of blue color intensity. When operating upon these four or eight bit quantities, portions of the arithmetic processing elements included in a general purpose microprocessor are unused. For example, a four bit addition being performed by a 32 bit adder circuit does not use the high order 28 bits of the adder circuit. The high order 28 bits of the adder circuit add zeros, and are wasted during the addition of the four bit values. The bits not used in the four or eight bit computations are effectively wasted during manipulations of the narrower-width data. As used herein, the term "high order" refers to bits which are most significant in a particular value. The term "low order" refers to bits which are least significant in a particular value.

Operating upon video data is often an inherently parallel process. For example, it is natural to operate upon the red, green, and blue color intensities of a pixel in parallel, since a similar operation may be applied to each color. Additionally, pixels which are located nearby may be operated upon in a similar manner. Because similar operations may be performed upon a variety of values, single instruction, multiple data (SIMD) architectures have been proposed. These architectures cause multiple independent data values to be operated upon simultaneously according to a particular instruction. Unfortunately, such architectures are limited to the relatively narrow operand widths selected for the SIMD instructions. SIMD architectures do not process wider operands efficiently.

It is increasingly common in many applications, such as signal processing applications, for a single microprocessor to operate upon several vastly different data types. Because the data types may require different amounts of accuracy, a particular microprocessor may be more or less efficient at performing the processing. A SIMD-type microprocessor may not be capable of efficiently processing wide operands, while a wide operand processor may not be capable of efficiently processing SIMD-type data. A microprocessor which is efficient at performing calculations upon many different data types and widths is desired.

SUMMARY OF THE INVENTION

The problems outlined above are in large part solved by an integer operation circuit in accordance with the present invention. The integer operation circuit is dynamically configurable to operate upon many different widths of operands. A single pair of operands may be operated upon, wherein the width of the operands is the maximum width the integer operation circuit is configured to handle. Alternatively, multiple pairs of operands having narrower widths may be operated upon. The instruction being executed defines the width of the operands and therefore the number of operands. Advantageously, a single instruction may cause operation upon a pair of wide operands, or upon multiple pairs of narrow operands. Wide operand operations are performed at an efficient rate of one per instruction, and an even more efficient rate of more than one per instruction is achieved for narrow operands.

Additionally, the same integer operation circuitry is employed to perform both narrow and wide integer operations. Silicon area consumed by the integer operation circuitry may be advantageously reduced as compared to a wide integer operation circuit and multiple narrow integer operation circuits. Reductions in silicon area may lead to reduced costs in manufacturing the microprocessor. Alternatively, multiple execute units including the integer operation circuit may be employed due to the reduced area occupied by the integer operation circuits.

Broadly speaking, the present invention contemplates an execute unit comprising a first circuit and a control unit. The first circuit is configured to perform an integer operation upon a first operand and a second operand, thereby producing a result. Coupled to the first circuit, the control unit receives an instruction corresponding to the first and second operands. The control unit is configured to assert a control signal if the instruction indicates that a first portion of the result is computed independent of a second portion of the result. The first portion of the result comprises the integer operation applied to a first portion of the first and second operands. Similarly, the second portion of the result comprises the integer operation applied to a second portion of the first and second operands. The control unit is configured to deassert the control signal if the instruction indicates that the result comprises the integer operation applied to the first operand and the second operand. The first circuit comprises a first integer operation circuit, a second integer operation circuit, and a second circuit. The first integer operation circuit is configured to perform the integer operation upon the first portion of the first and second operands, thereby producing the first portion of the result. The second integer operation circuit is configured to perform the integer operation upon the second portion of the first and second operands, thereby producing the second portion of the result. The second circuit is configured to modify the second portion of the result upon deassertion of the control signal to produce the result comprising the integer operation applied to the first operand and the second operand.

The present invention further contemplates a method of operating a first integer operation circuit and a second integer operation circuit, comprising several steps. An integer operation is performed upon a first operand and a second operand in the first integer operation circuit, thereby producing a first result. Similarly, the integer operation is performed upon a third operand and a fourth operand in the second integer operation circuit, thereby producing a second result. The second result is modified using a circuit if a control signal from a control unit is deasserted, such that the first result and the second result comprise a third result. The third result is indicative of performing the integer operation upon a fifth operand comprising the first and third operands and a sixth operand comprising the second and fourth operands. The first result and the second result are independent if the control signal is asserted.

BRIEF DESCRIPTION OF THE DRAWINGS

Other objects and advantages of the invention will become apparent upon reading the following detailed description and upon reference to the accompanying drawings in which.

Figure 1:
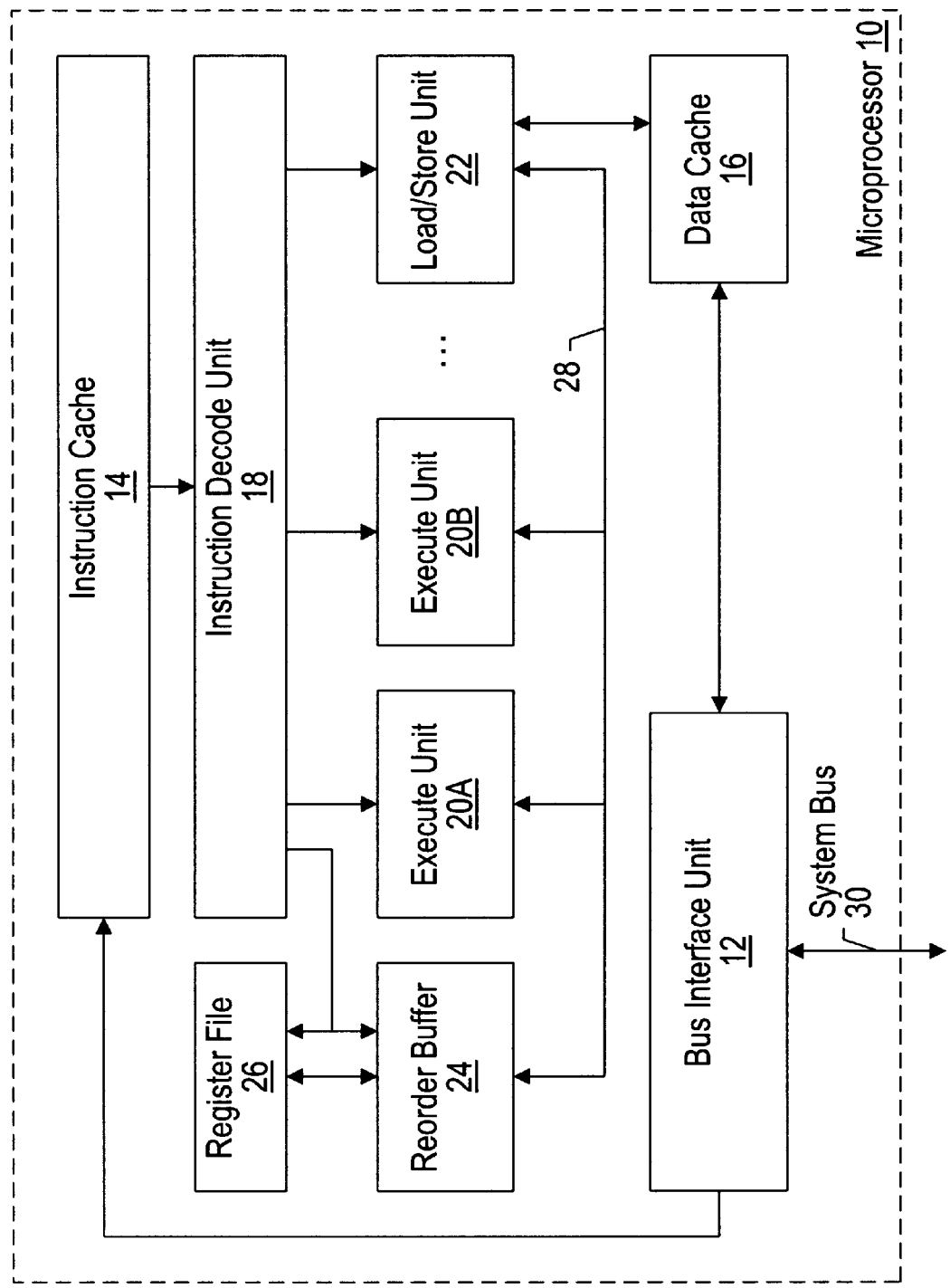
FIG. 1 is a block diagram of a microprocessor including execute units.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a microprocessor 10 is shown. Microprocessor 10 includes a bus interface unit 12, an instruction cache 14, a data cache 16, an instruction decode unit 18, a plurality of execute units including execute units 20A and 20B, a load/store unit 22, a reorder buffer 24, and a register file 26. The plurality of execute units will be collectively referred to herein as execute units 20. Bus interface unit 12 is coupled to instruction cache 14 and data cache 16. Additionally, a system bus 30 is coupled to bus interface unit 12. Instruction cache 14 is coupled to instruction decode unit 18, which is further coupled to execute units 20, reorder buffer 24, and load/store unit 22. Reorder buffer 24, execute units 20, and load/store unit 22 are each coupled to a result bus 28 for forwarding of execution results. Load/store unit 22 is coupled to data cache 16.

Generally speaking, execute units 20 are configured to execute instructions which specify wide operands and SIMD instructions which simultaneously specify a plurality of narrower operands. Integer operation circuits within execute units 20 may be configured to interpret input operands as single values of a particular width (e.g. 32 bits). Alternatively, the integer operation circuits may be configured to interpret input operands as a plurality of independent values to be operated upon independently and in parallel, thereby producing a plurality of independent results. The width of each of the plurality of values and results is narrower than the particular width employed by the non-SIMD instructions. For example, the width of the plurality of values may be four or eight bits. A particular SIMD instruction may specify a particular width of operands, and the number of independent operands and results is implied from the particular width and the width of the integer operation circuits. For example, if the integer operation circuits are configured to operate upon 32 bit operands and the particular SIMD instruction specifies 4 bit operands, then eight independent values from each operand are operated upon and eight independent results are produced. It is noted that values within an operand and corresponding results are independent if the results are computed based upon the corresponding values within the operand and other values within the operand have no effect upon that result.

Execute units 20 are advantageously capable of efficient execution of computer programs which manipulate narrow width data, while also being capable of executing computer programs which manipulate wide width data. The same integer operation circuits within execute units 20 perform both the multiple narrow-width computations and the wide width computations. Control signals asserted in response to the instruction conveyed thereto are used to configure the integer operation circuits for narrow-width or wide-width computations. Additionally, the control signals select one of multiple narrow-widths (e.g. four, eight, or 16 bits) when narrow-width computation is performed. Because the same integer operation circuits are used to perform both the narrow and wide width computations, silicon area occupied by execute units 20 may be reduced as compared to an execute unit which includes a plurality of narrow width integer operation circuits and a wide width integer operation circuit.

As opposed to fetching narrow-width operands from a variety of storage locations, narrow-width operands to be simultaneously operated upon may be assembled into a single register within register file 26. Alternatively, the narrow-width operands may be stored in contiguous storage locations within main memory such that they are accessed simultaneously by a memory operand having an appropriate address. The narrow-width operands may thereby be routed through the various units of microprocessor 10 (except for execute units 20) in the same manner as a wide-width operand. Execute units 20 are aware of the multiple operand nature of the values, but other units may not be aware of the multiple operand nature.

Instruction cache 14 is a high speed cache memory for storing instructions. It is noted that instruction cache 14 may be configured into a set-associative or direct mapped configuration. Instruction cache 14 may additionally include a branch prediction mechanism for predicting branch instructions as either taken or not taken. A "taken" branch instruction causes instruction fetch and execution to continue at the target address of the branch instruction. A "not taken" branch instruction causes instruction fetch and execution to continue at the instruction subsequent to the branch instruction. Instructions are fetched from instruction cache 14 and conveyed to instruction decode unit 18 for decode and dispatch to an execution unit.

Instruction decode unit 18 decodes each instruction fetched from instruction cache 14. Instruction decode unit 18 dispatches the instruction to execute units 20 and/or load/store unit 22. Instruction decode unit 18 also detects the register operands used by the instruction and requests these operands from reorder buffer 24 and register file 26. In one embodiment, execute units 20 are symmetrical execution units. Symmetrical execution units are each configured to execute a particular subset of the instruction set employed by microprocessor 10. The subsets of the instruction set executed by each of the symmetrical execution units are the same. In another embodiment, execute units 20 are asymmetrical execution units configured to execute dissimilar instruction subsets. For example, execute units 20 may include a branch execute unit for executing branch instructions, one or more arithmetic/logic units for executing arithmetic and logical instructions, and one or more floating point units for executing floating point instructions. Instruction decode unit 18 dispatches an instruction to an execute unit 20 or load/store unit 22 which is configured to execute that instruction.

Load/store unit 22 provides an interface between execute units 20 and data cache 16. Load and store memory operations are performed by load/store unit 22 to data cache 16. Additionally, memory dependencies between load and store memory operations are detected and handled by load/store unit 22.

Execute units 20 and load/store unit 22 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 18, execute units 20, and load/store unit 22. Such an embodiment may perform the dispatch function within the centralized reservation station.

Microprocessor 10 supports out of order execution, and employs reorder buffer 24 for storing execution results of speculatively executed instructions and storing these results into register file 26 in program order, for performing dependency checking and register renaming, and for providing for mispredicted branch and exception recovery. When an instruction is decoded by instruction decode unit 18, requests for register operands are conveyed to reorder buffer 24 and register file 26. In response to the register operand requests, one of three values is transferred to the execute unit 20 and/or load/store unit 22 which receives the instruction: (1) the value stored in reorder buffer 24, if the value has been speculatively generated; (2) a tag identifying a location within reorder buffer 24 which will store the result, if the value has not been speculatively generated; or (3) the value stored in the register within register file 26, if no instructions within reorder buffer 24 modify the register. Additionally, a storage location within reorder buffer 24 is allocated for storing the results of the instruction being decoded by instruction decode unit 18. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 20 or load/store unit 22 execute an instruction, the tag assigned to the instruction by reorder buffer 24 is conveyed upon result bus 28 along with the result of the instruction. Reorder buffer 24 stores the result in the indicated storage location. Additionally, execute units 20 and load/store unit 22 compare the tags conveyed upon result bus 28 with tags of operands for instructions stored therein. If a match occurs, the unit captures the result from result bus 28 and stores it with the corresponding instruction. In this manner, an instruction may receive the operands it is intended to operate upon. Capturing results from result bus 28 for use by instructions is referred to as "result forwarding".

Instruction results are stored into register file 26 by reorder buffer 24 in program order. Storing the results of an instruction and deleting the instruction from reorder buffer 24 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 24 discards the instructions subsequent to the mispredicted branch instructions. Instructions thus discarded are also flushed from execute units 20, load/store unit 22, and instruction decode unit 18.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146, 382, filed Oct. 29, 1993 by Witt, et al. These documents are incorporated herein by reference in their entirety.

Register file 26 includes storage locations for each register defined by the microprocessor architecture employed by microprocessor 10. For example, microprocessor 10 may employ the x86 microprocessor architecture. For such an embodiment, register file 26 includes locations for storing the EAX, EBX, ECX, EDX, ESI, EDI, ESP, and EBP register values.

Data cache 16 is a high speed cache memory configured to store data to be operated upon by microprocessor 10. It is noted that data cache 16 may be configured into a set-associative or direct-mapped configuration.

Bus interface unit 12 is configured to effect communication between microprocessor 10 and devices coupled to system bus 30. For example, instruction fetches which miss instruction cache 14 may be transferred from main memory by bus interface unit 12. Similarly, data requests performed by load/store unit 22 which miss data cache 16 may be transferred from main memory by bus interface unit 12. Additionally, data cache 16 may discard a cache line of data which has been modified by microprocessor 10. Bus interface unit 12 transfers the modified line to main memory.

It is noted that instruction decode unit 18 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 16, executing the instruction, and transferring the result to memory (if the destination operand is a memory location). Load/store unit 22 performs the memory transfers, and an execute unit 20 performs the execution of the instruction.

Figure 2:
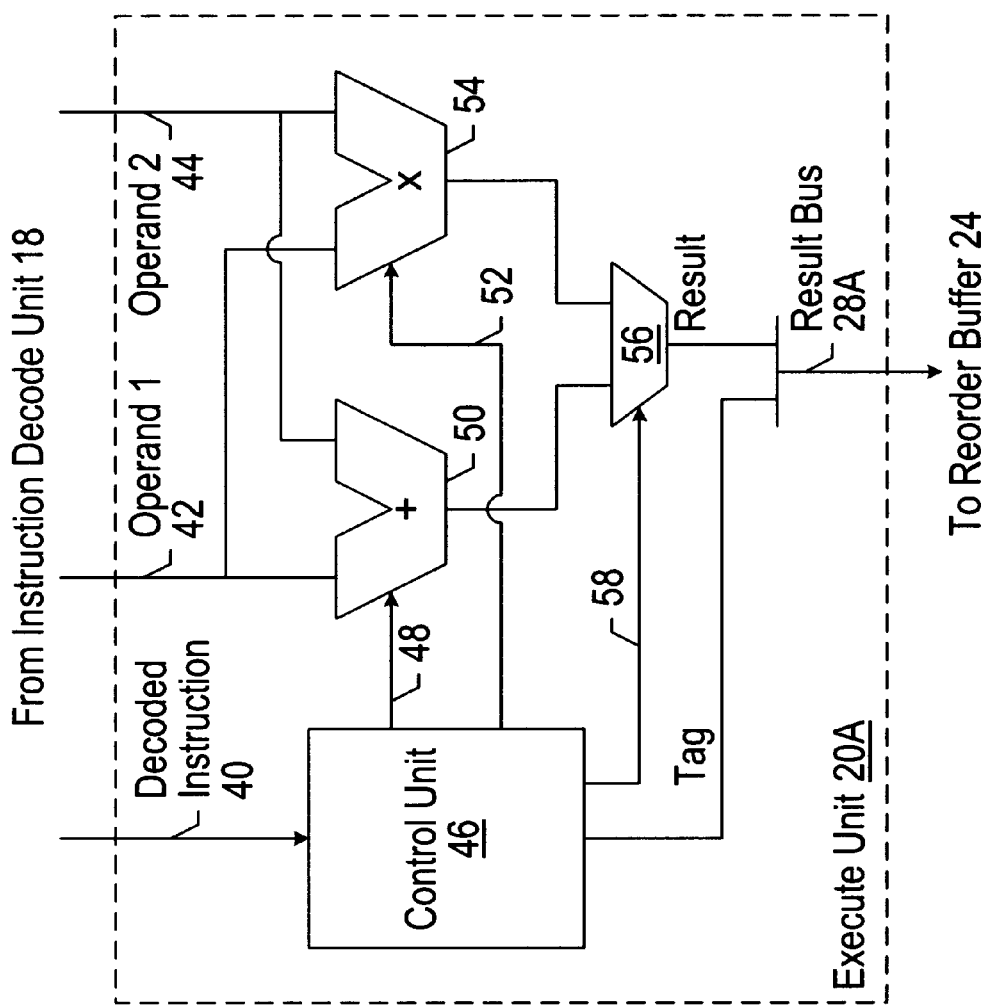
FIG. 2 is a logic diagram of one embodiment of one of the execute units shown in FIG. 1.

Turning now to FIG. 2, a logic diagram of one embodiment of execute unit 20A is shown. Other execute units 20 may be configured similarly. Execute unit 20A receives a decoded instruction from instruction decode unit 18 (possibly through a reservation station if one is included in microprocessor 10) upon a decoded instruction bus 40. A first operand corresponding to the decoded instruction is received upon a first operand bus 42, while a second operand is received upon a second operand bus 44. A control unit 46 is coupled to decoded instruction bus 40. A first set of control lines 48 are coupled between control unit 46 and an adder circuit 50. Similarly, a second set of control lines 52 are coupled between control unit 46 and a multiplier circuit 54. Both first operand bus 42 and second operand bus 44 are coupled to both adder circuit 50 and multiplier circuit 54. Results produced by adder circuit 50 and multiplier circuit 54 are transmitted to a multiplexor circuit 56 which receives a select line 58 from control unit 46. A result thereby selected is conveyed upon result bus 28A (one of result buses 28). A reorder buffer tag assigned to the decoded instruction and conveyed upon decoded instruction bus 40 is conveyed upon result bus 28A by control unit 46 as well.

As shown in FIG. 2, execute unit 20A may compute either an addition or a multiplication of operands conveyed upon first and second operand buses 42 and 44. Adder circuit 50 and multiplier circuit 54 are examples of integer operation circuits. Dependent upon the decoded instruction, control unit 46 toggles select line 58 to select the addition result from adder circuit 50 or the multiplication result from multiplier circuit 54 for conveyance upon result bus 28A. In one embodiment, adder circuit 50 is configured to add two 32 bit operands to produce a 32 bit addition result. The result is conveyed upon result bus 28A. For this embodiment, multiplier circuit 54 is configured to multiply two 32 bit numbers, thereby producing a 64 bit result. The result is conveyed upon result bus 28A. Other operand and result sizes are contemplated as well. For example, 64 bit operands and 64 or 128 bit results are contemplated.

In addition to operating upon two 32 bit operands supplied upon first and second operand buses 42 and 44, the present embodiment may receive multiple independent operands upon each operand bus. The number of independent operands is determined by the instruction encoding as conveyed upon decoded instruction bus 40. The present embodiment allows for eight 4 bit operands, four 8 bit operands, or 2 sixteen bit operands to be conveyed upon each of first and second operand buses 42 and 44. Signals upon decoded instruction bus 40 indicate which set of narrow-width operands is selected for the current instruction. Control unit 46 asserts first control signals 48 and second control signals 52 accordingly. In response to the control signals, adder circuit 50 and multiplication circuit 54 interpret the 32 bits upon each of operand buses 42 and 44 as one 32 bit operand, two 16 bit operands, four 8 bit operands, or eight 4 bit operands. Additionally, the results conveyed by adder circuit 50 are interpreted as one 32 bit result, two 16 bit results, four 8 bit results, or eight 4 bit results, respectively. Similarly, the result from multiplier circuit 54 is interpreted as one 64 bit result, two 32 bit results, four 16 bit results, or eight 8 bit results, respectively.

In addition to conveying the result of the integer operation, certain additional information may be conveyed. For additions, an indication of overflow from the 32 bit addition may be conveyed. Additionally, an overflow from each of the narrower additions may be conveyed upon result bus 28A. The overflow or overflows may be stored in a flags register for inspection by subsequent instructions. Alternatively, microprocessor 10 may be configured to saturate additions which overflow to the maximum value which may be represented by the result. The overflow indications may be used to determine when saturation should be applied.

Figure 3:
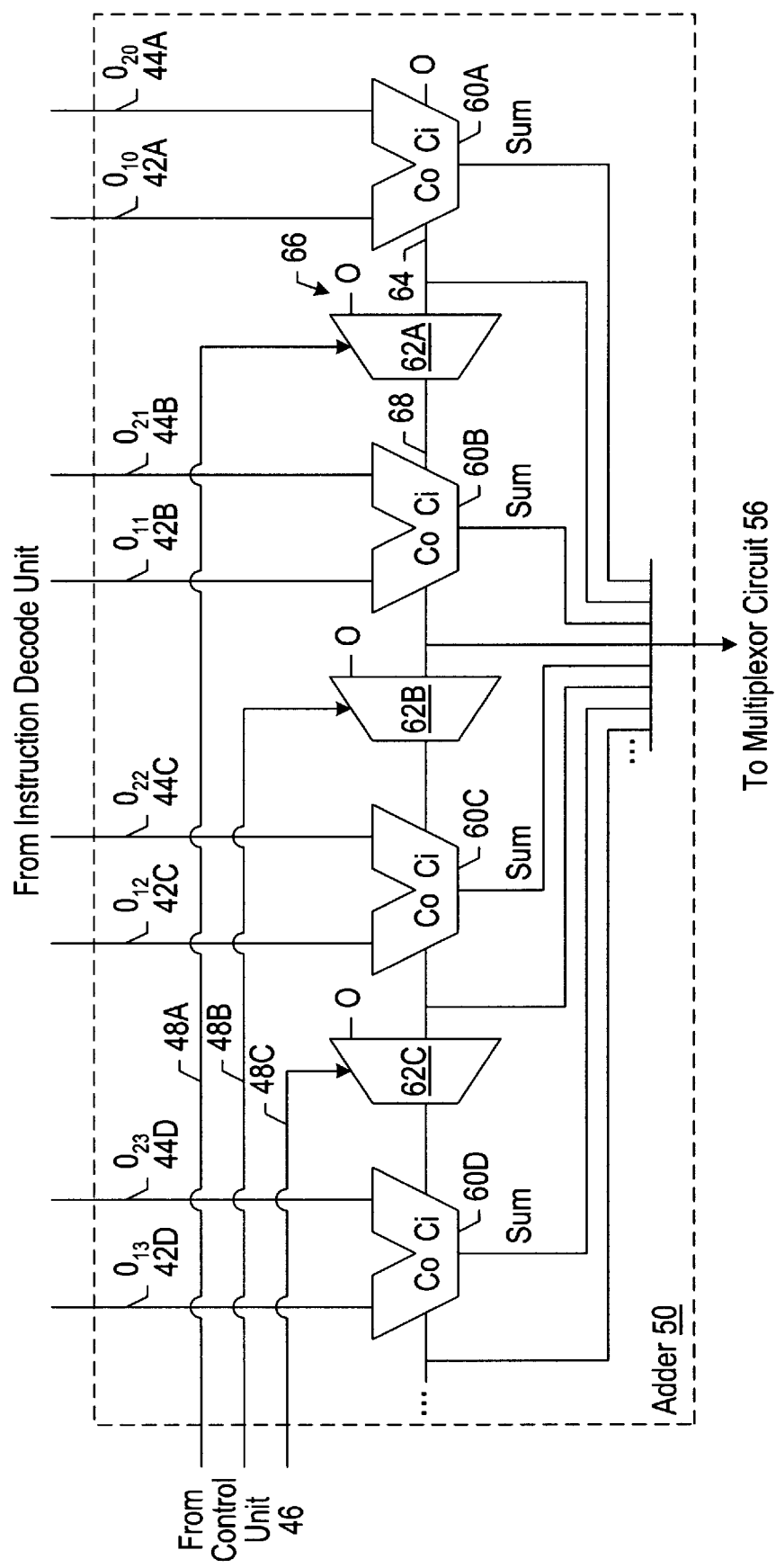
FIG. 3 is a logic diagram of one embodiment of an adder circuit shown in FIG. 2.

Turning now to FIG. 3, a logic diagram of a portion of one embodiment of adder circuit 50 is shown. The portion of adder circuit 50 shown computes the low order 16 bits of the addition of the operands upon first and second operand buses 42 and 44. Portions of the first operand labeled $O_{10}$, $O_{11}$, $O_{12}$, and $O_{13}$ are shown on corresponding first operand bus lines 42A, 42B, 42C, and 42D. In the present embodiment, each portion is 4 bits, with the second digit of the label indicating the order of the bits in the operand. For example, $O_{10}$ is the lowest order 4 bits of the first operand, $O_{11}$ is the second lower order 4 bits, etc. Similarly, $O_{20}$, $O_{21}$, $O_{22}$, and $O_{23}$ comprise the low order sixteen bits of the second operand, conveyed upon second operand bus lines 44A, 44B, 44C, and 44D.

Each portion of the first operand is added to the corresponding portion of the second operand via an individual adder circuit 60A–60D. Each adder circuit 60 produces a sum which is conveyed as a portion of the result of adder circuit 50. Additionally, each adder circuit 60 receives a carry-in input and produces a carry-out output. The carry-in input comprises a bit which is added to the sum of the portion of the first and second operands which is conveyed to the corresponding adder circuit 60. Similarly, the carry-out output comprises a bit which indicates the carry produced by adding the first and second operands and the carry-in. The carry-in input for each adder circuit 60 is labeled $C_i$. Similarly, the carry-out output for each adder circuit 60 is labeled $C_o$.

The carry-out output of each adder circuit 60 is conveyed to multiplexor circuit 56 along with the sum from the adder circuit 60 (e.g. reference number 64). The carry-out outputs may be used along with information regarding the size of the operands operated upon by adder circuit 50 to detect overflows from each of the one or more additions being concurrently performed by adder circuit 50. Additionally, the carry-out output of each adder circuit 60A–60D is conveyed to a selection circuit 62A–62C (selection circuit 62D coupled to the carry-out output of adder circuit 60D not shown). Selection circuits 62A–62C also include a constant zero bit input, shown as a zero feeding into selection circuits 62A–62C (e.g. reference number 66). Selection circuits 62A–62C are coupled to respective control lines 48A, 48B, and 48C (part of control lines 48 shown in FIG. 2).

By asserting combinations of control signals upon control lines 48, control unit 46 configures adder circuit 50 to perform various widths of additions. When the control signal upon control line 48A–48C is asserted, the corresponding selection circuit 62A–62C conveys the constant zero as the carry-in to the adder circuit 60B–60D connected thereto (e.g. reference number 68). Therefore, if all three control lines 48A–48C are asserted, then each adder circuit 60A–60D receives a zero carry-in. Each adder circuit 60A–60D thereby performs an independent addition. Each adder circuit 60A–60D contributes four bits of the result conveyed to selection circuit 56. The four bits comprise independent four bit results in this case. If the control signal upon control line 48B is asserted and control lines 48A and 48C are deasserted, then adder circuits 60A–60B perform an independent addition upon the low order eight bits of the first and second operands ($O_{10}$, $O_{11}$, $O_{20}$, and $O_{21}$) while adder circuits 60C–60D perform an independent addition upon the next lowest order eight bits of the first and second operands ($O_{12}$, $O_{13}$, $O_{22}$, and $O_{23}$). The carry-out of adder circuit 60A is propagated as a carry-in to adder circuit 60B, and the carry-out of adder circuit 60C is propagated as a carry-in to adder circuit 60D. However, adder circuit 60C is provided a zero carry-in via selection circuit 62B. In this manner, the low order eight bits of the result from adder circuit 50 comprise an independent result, as does the next lowest order eight bits of the result from adder circuit 50. If none of the control signals upon control lines 48 are asserted, then each selection circuit 62 conveys the carry-out of one of the adder circuits to the carry-in of the next consecutive adder circuits. Adder circuits 60 thereby form a 16 bit sum of the low order 16 bits of the first and second operands, and convey the sum as the low order 16 bits of the result from adder circuit 50. The remaining portion of adder circuit 50 may be configured similar to the portion shown in FIG. 3. In this manner, eight 4 bit additions, four 8 bit additions, two 16 bit additions, or one 32 bit addition may be formed by adder circuit 50.

Additionally, adder circuit 50 may perform independent additions upon dissimilar sized operands concurrently. For example, by asserting control signals upon control lines 48A and 48B and deasserting a control signal upon control line 48C, two 4 bit additions and an eight bit addition may be performed concurrently. Adder circuits 60A and 60B perform four bit additions while adder circuits 60C and 60D perform an eight bit addition. Any combination of dissimilar operand sizes between concurrently performed additions may be supported by adder circuit 50.

Although discussed with respect to FIG. 3 as four bit portions, adder circuit 50 may be configured to operate upon larger portions. For example, if eight bit portions are the narrowest operands of interest, adder circuit 50 may employ eight bit individual adder circuits instead of four bit individual adder circuits. Any size individual adder circuits may be suitable for various embodiments of adder circuit 50. Additionally, individual adder circuits having any number of inputs may be utilized in a similar manner to form configurable adder circuits.

Figure 4:
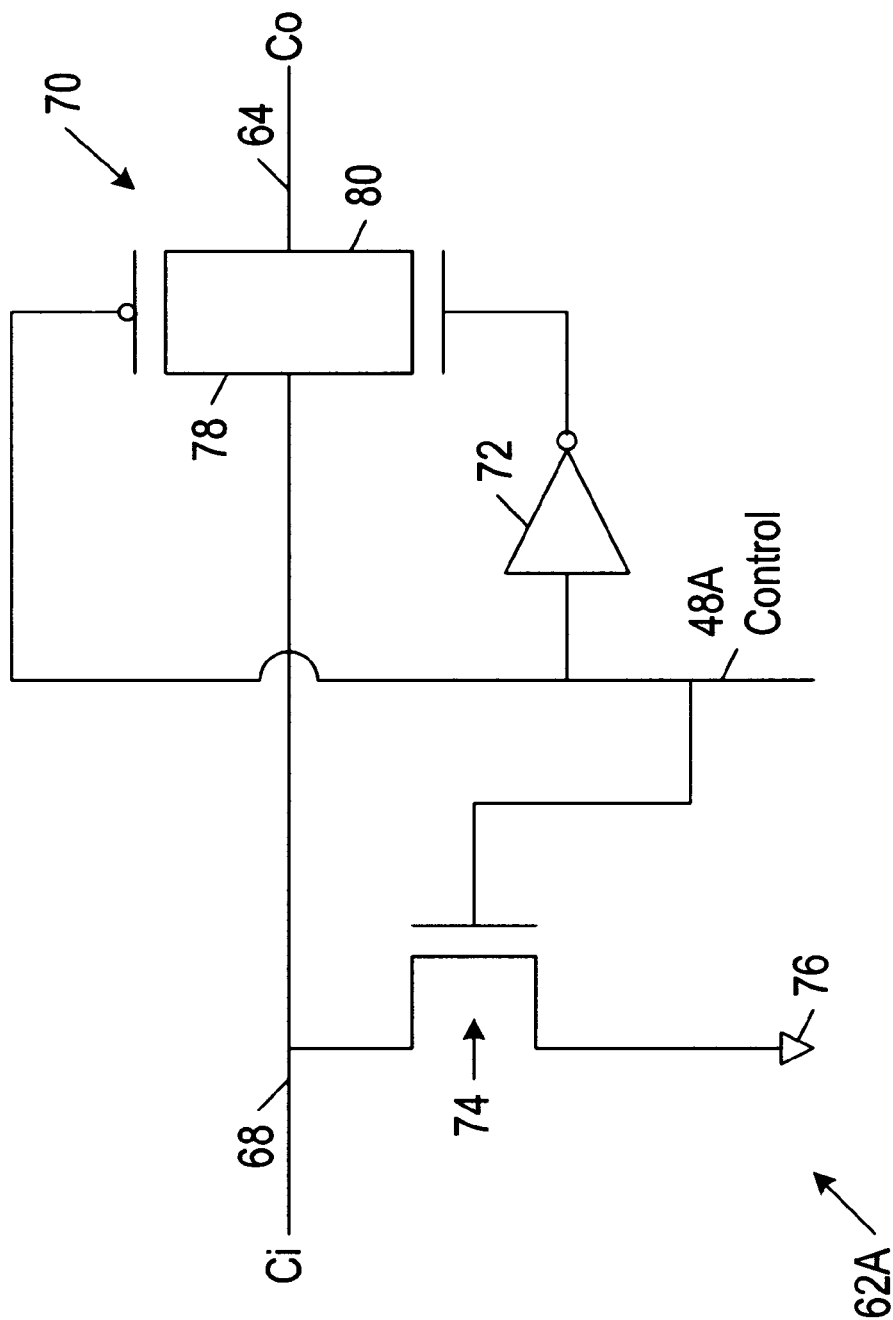
FIG. 4 is a circuit diagram of one embodiment of a selection circuit shown in FIG. 3.

Turning now to FIG. 4, a circuit diagram of one embodiment of selection circuit 62A is shown. The circuit diagram of FIG. 4 depicts a Complimentary Metal Oxide Semiconductor (CMOS) circuit. Other selection circuits may be configured similarly. As will be appreciated by those of skill in the art, CMOS circuits may include two types of transistors: PMOS transistors and NMOS transistors. NMOS transistors are activated when a voltage upon the gate terminal exceeds the voltage upon the source or drain terminals. PMOS transistors are activated when a voltage upon the gate terminal is less than the voltage upon the source or drain terminal.

Selection circuit 62A receives a carry-out output from adder circuit 60A (labeled $C_o$ in FIG. 4, reference number 64), and provides a value upon a carry-in input to adder circuit 60B (labeled $C_i$ in FIG. 4, reference number 68). Additionally, control line 48A is coupled to selection circuit 62A. Selection circuit 62A includes a transmission gate 70, and inverter circuit 72, and an NMOS transistor 74. Transmission gate 70 comprises a PMOS transistor 78 and an NMOS transistor 80 coupled in parallel. The gate terminals of PMOS transistor 78 and NMOS transistor 74 are coupled to control line 48A. Inverter circuit 72 is coupled between control line 48A and the gate terminal of NMOS transistor 80.

For the circuit shown in FIG. 4, the control signal upon control line 48A is defined to be asserted when a logical one value is conveyed (i.e. the power supply voltage level). When the control signal is asserted, transistor 74 is activated. Transistor 74 discharges the carry-in input of adder circuit 60B to the ground voltage corresponding to a ground reference 76. Additionally, transmission gate 70 is deactivated, isolating the carry-out output of adder circuit 60A from the carry-in input of adder circuit 60B. Adder circuit 60B is thereby provided with a zero carry-in input when the control signal upon control line 48A is asserted.

Alternatively, the control signal upon control line 48B may be deasserted. Transistor 74 is deactivated, and transmission gate 70 is activated. The value conveyed upon the carry-out output of adder circuit 60A is thereby conveyed to the carry-in input of adder circuit 60B.

Figure 5:
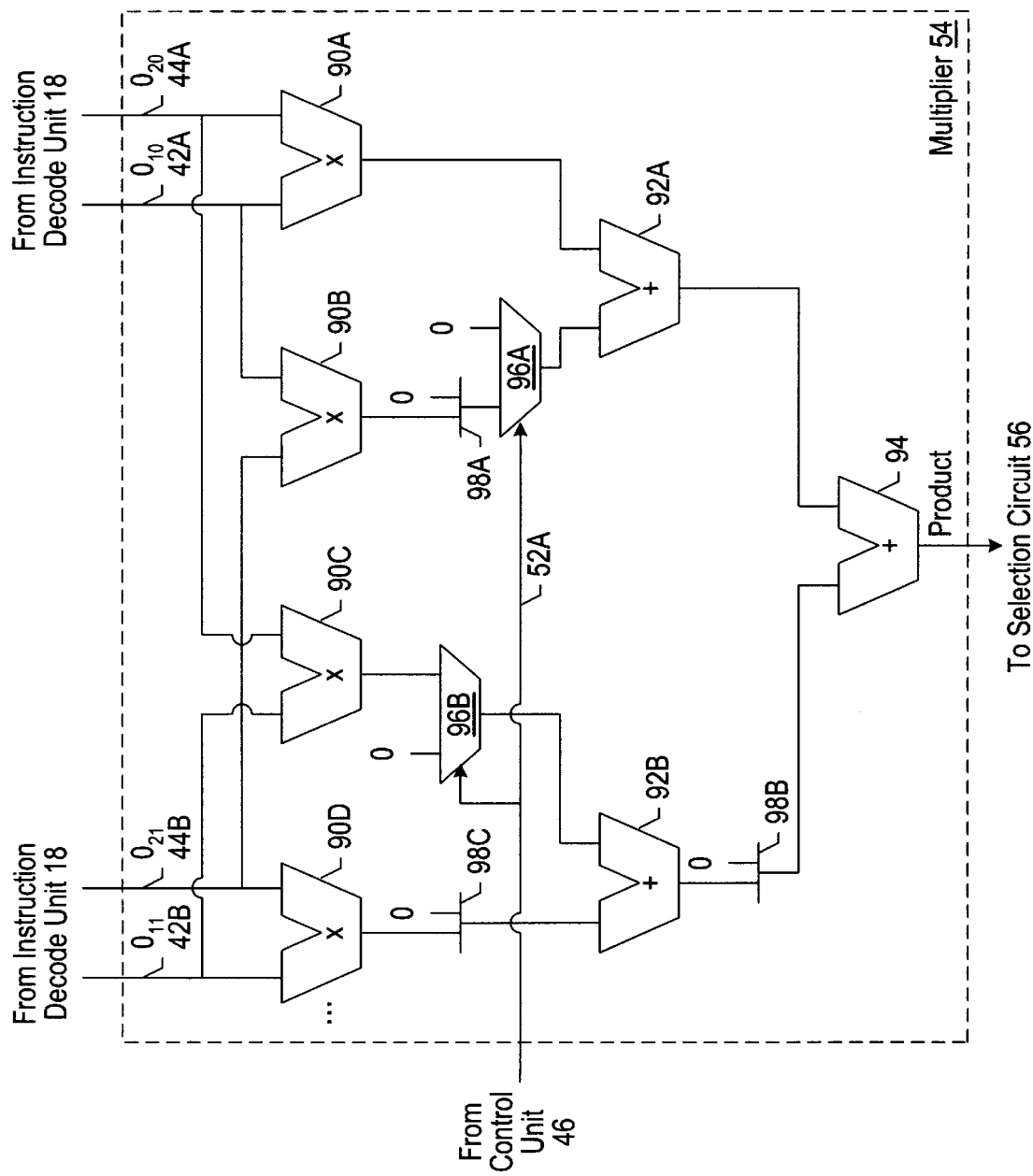
FIG. 5 is a logic diagram of one embodiment of a multiplier circuit shown in FIG. 2.

Turning now to FIG. 5, a logic diagram of a portion of one embodiment of multiplier circuit 54 is shown. The low order 8 bits of the first and second operands are conveyed as $O_{10}$, $O_{11}$, $O_{20}$, and $O_{21}$ upon first operand bus lines 42A and 42B and second operand bus lines 44A and 44B, as discussed with respect to FIG. 3. Multiplier circuit 54 includes individual multiplier circuits 90A–90D. Multiplier circuit 90A is coupled to first operand bus lines 42A and second operand bus lines 44A. Multiplier circuit 90B is coupled to first operand bus lines 42A and second operand bus lines 44B. Multiplier circuit 90C is coupled to first operand bus lines 42B and second operand bus lines 44A. Finally, multiplier circuit 90D is coupled to first operand bus lines 42B and second operand bus lines 42B. Multiplier circuits 90A and 90D are respectively coupled to adder circuits 92A and 92B, which are further coupled to adder circuit 94. Multiplier circuits 90B and 90C are respectively coupled through selection circuits 96A and 96B to adder circuits 92A and 92B. Selection circuits 96A and 96B receive selection controls via control line 52A (one of control lines 52).

As shown in FIG. 5, multiplier circuits 90 multiply four bit portions of the first and second operand, forming eight bit results (or products). If the control signal upon control line 52A is deasserted, selection circuits 96A and 96B route the products from multiplier circuits 90B and 90C to adder circuits 92A and 92B. In this manner, a portion of the product of the first and second operands is computed. It is noted that adder circuit 94 receives other inputs for forming the complete product. In order to properly form the product, the results computed by multiplier circuits 90B–90D (and other multiplier circuits 90, not shown) are shifted left by a number of bits dependent upon the order of the four bit quantities multiplied by the multiplier circuit 90. Multiplier circuit 90A multiplies the lowest order four bits of each operand, thereby requiring no shifting. Multiplier circuit 90B multiplies the next lowest order four bits of the second operand to the lowest order four bits of the first operand ($O_{21}$ and $O_{10}$). Therefore, the result is shifted left by four bits to account for multiplying the next lowest order four bits of the second operand (i.e. the next lowest order four bits of the operand has a numerical value of $O_{21}*16^1$). The left shift is performed by concatenating four low order zeros to the product produced by multiplier circuit 90B, shown as bus connector 98A. Similarly, the result of adder 90C is shifted left by four bits to account for multiplying the next to lowest order four bits of the first operand to the lowest order four bits of the second operand ($O_{11}$ and $O_{20}$). The left shift occurs at bus connector 98B. Finally, the product produced by multiplier circuit 90D is shifted left by eight bits, since multiplier circuit 90D multiplies the next to lowest order four bits of both the first and second operands ($O_{21}$ and $O_{11}$, having numerical values $O_{21}*16^1$ and $O_{11}*16^1$, respectively). This left shift is accomplished at bus connectors 98C and 98B.

Because multiplier circuits 90A and 90D produce eight bit products and the product of multiplier circuit 90D is shifted left by eight bits, the two products are independent of each other when added at adder circuit 94. Therefore, if the control signal upon control line 52A is asserted, (causing zero to be supplied as the products from multiplier circuits 90B and 90C), the product produced in the low order 16 bits of multiplier circuit 54 comprises two independent eight bit products. One of the products is indicative of the multiplication of $O_{10}$ and $O_{20}$, and the other product is indicative of the multiplication of $O_{11}$ and $O_{21}$.

A similar structure to that shown in FIG. 5 may be used to form the remainder of the product of the first and second operands. Additionally, control signals upon additional control lines 52 may be asserted such that additional independent eight bit products are produced by multiplier circuit 54. Selection circuits 96 are included between each multiplier circuit 90 and the corresponding adder circuit 92 except for those multiplier circuits which form the independent 8 bit products of four bit operands. These products are included within each possible product formed by multiplier circuit 54. Still further, combinations of control signals asserted to selection devices 96 may be used to form independent 16 bit products of eight bit operands, where the eight bit operands are formed using consecutive eight bit fields (i.e. $O_{11}$ and $O_{10}$ form an eight bit first operand, as well as $O_{13}$ and $O_{12}$, $O_{15}$ and $O_{14}$, and $O_{17}$ and $O_{16}$). Additional combinations of control signals may be asserted to cause independent 32 bit products of 16 bit operands. If no control signals are asserted, one 64 bit product of the first and second operands is produced.

In order to further illuminate the operation of multiplier circuit 54, a mathematical explanation of the operation will now be described. The first operand may be represented as $O_{17}O_{16}O_{15}O_{14}O_{13}O_{12}O_{11}O_{10}$ and the second operand may similarly be represented as $O_{27}O_{26}O_{25}O_{24}O_{23}O_{22}O_{21}O_{20}$, wherein each $O_{xx}$ comprises four bits and the second subscript identifies order. A larger second subscript indicates higher order bits upon first operand bus 42 and second operand bus 44, respectively. Numerical interpretations may be applied to the first and second operands as shown in table 1 below. Table 1 shows the numerical interpretation of the first operand, and the numerical interpretation of the second operand is similar. The numerical interpretation is dependent upon the size of the operands as indicated by the instruction being executed.

TABLE 1

| Numerical Interpretation of the First Operand | |
|---|---|
| Operand Size | Numerical Interpretation |
| 32 bit | $O_{17}*16^7 + O_{16}*16^6 + O_{15}*16^5 + O_{14}*16^4 + O_{13}*16^3 + O_{12}*16^2 + O_{11}*16 + O_{10}$ |
| 16 bit | $O_{17}*16^3 + O_{16}*16^2 + O_{15}*16 + O_{14}$ |
| | $O_{13}*16^3 + O_{12}*16^2 + O_{11}*16 + O_{10}$ |

TABLE 1-continued

| Numerical Interpretation of the First Operand | |
|---|---|
| Operand Size | Numerical Interpretation |
| 8 bit | $O_{17}*16 + O_{16}$ |
| | $O_{15}*16 + O_{14}$ |
| | $O_{13}*16 + O_{12}$ |
| | $O_{11}*16 + O_{10}$ |
| 4 bit | $O_{17}$ |
| | $O_{16}$ |
| | $O_{15}$ |
| | $O_{14}$ |
| | $O_{13}$ |
| | $O_{12}$ |
| | $O_{11}$ |
| | $O_{10}$ |

The product of two 32 bit operands is then given by:

$$P_{32} = O_{17}O_{27}*16^{14} + O_{17}O_{26}*16^{13} + O_{17}O_{25}*16^{12} + O_{17}O_{24}*16^{11} +$$
$$O_{17}O_{23}*16^{10} + O_{17}O_{22}*16^9 + O_{17}O_{21}*16^8 + O_{17}O_{20}*16^7 +$$
$$O_{16}O_{27}*16^{13} + O_{16}O_{26}*16^{12} + O_{16}O_{25}*16^{11} + O_{16}O_{24}*16^{10} +$$
$$O_{16}O_{23}*16^9 + O_{16}O_{22}*16^8 + O_{16}O_{21}*16^7 + O_{16}O_{20}*16^6 +$$
$$O_{15}O_{27}*16^{12} + O_{15}O_{26}*16^{11} + O_{15}O_{25}*16^{10} + O_{15}O_{24}*16^9 +$$
$$O_{15}O_{23}*16^8 + O_{15}O_{22}*16^7 + O_{15}O_{21}*16^6 + O_{15}O_{20}*16^5 +$$
$$O_{14}O_{27}*16^{11} + O_{14}O_{26}*16^{10} + O_{14}O_{25}*16^9 + O_{14}O_{24}*16^8 +$$
$$O_{14}O_{23}*16^7 + O_{14}O_{22}*16^6 + O_{14}O_{21}*16^5 + O_{14}O_{20}*16^4 +$$
$$O_{13}O_{27}*16^{10} + O_{13}O_{26}*16^9 + O_{13}O_{25}*16^8 + O_{13}O_{24}*16^7 +$$
$$O_{13}O_{23}*16^6 + O_{13}O_{22}*16^5 + O_{13}O_{21}*16^4 + O_{13}O_{20}*16^3 +$$
$$O_{12}O_{27}*16^9 + O_{12}O_{26}*16^8 + O_{12}O_{25}*16^7 + O_{12}O_{24}*16^6 +$$
$$O_{12}O_{23}*16^5 + O_{12}O_{22}*16^4 + O_{12}O_{21}*16^3 + O_{12}O_{20}*16^2 +$$
$$O_{11}O_{27}*16^8 + O_{11}O_{26}*16^7 + O_{11}O_{25}*16^6 + O_{11}O_{24}*16^5 +$$
$$O_{11}O_{23}*16^4 + O_{11}O_{22}*16^3 + O_{11}O_{21}*16^2 + O_{11}O_{20}*16 +$$
$$O_{10}O_{27}*16^7 + O_{10}O_{26}*16^6 + O_{10}O_{25}*16^5 + O_{10}O_{24}*16^4 +$$
$$O_{10}O_{23}*16^3 + O_{10}O_{22}*16^2 + O_{10}O_{21}*16 + O_{10}O_{20}$$

Figure 5A:
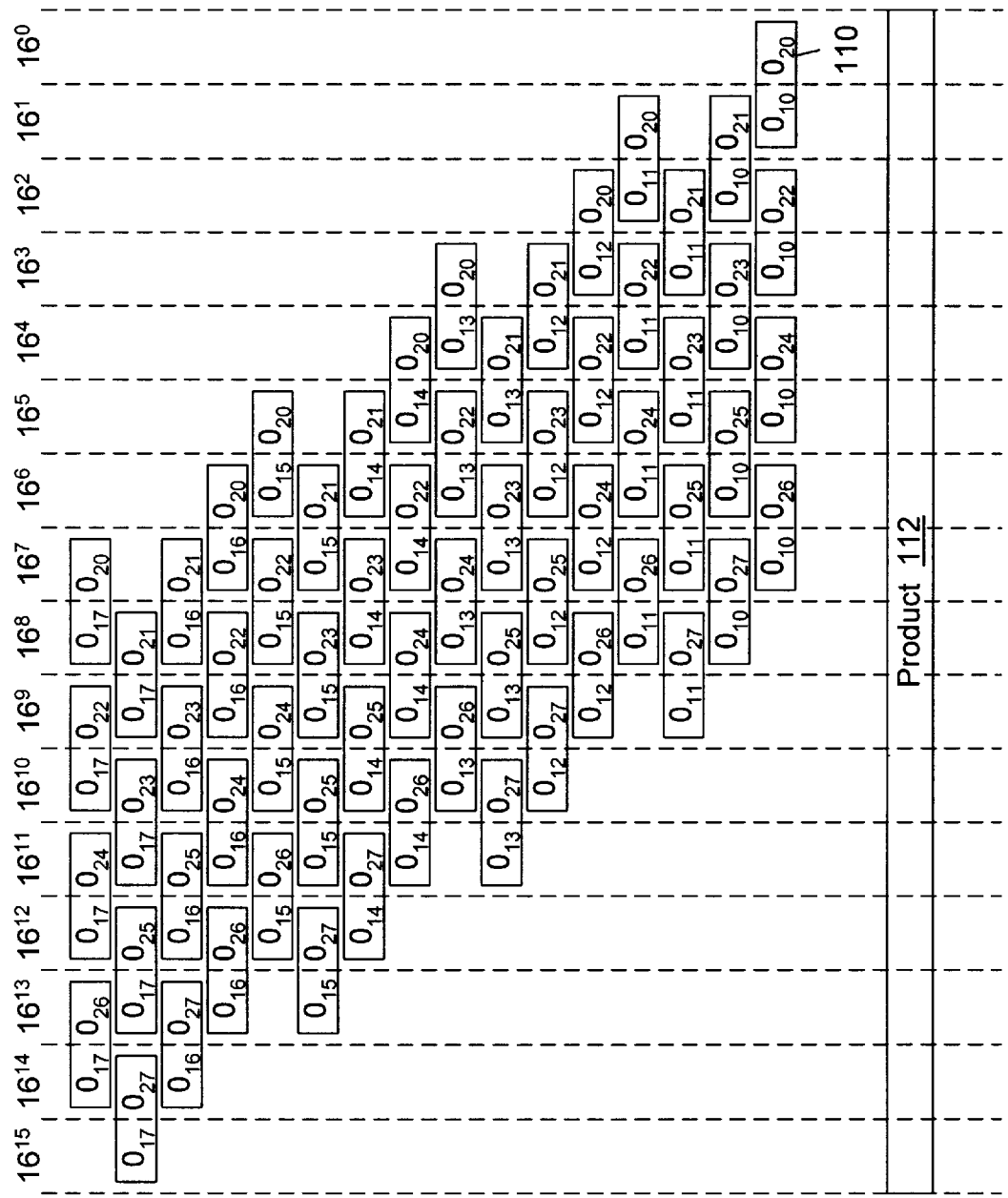
FIG. 5A is a diagram depicting a product of two 32 bit operands.

It is noted that the multiplication by $16^x$ is performed in FIG. 5 via concatenating low order zeros to the result provided by each individual multiplication circuit 90. FIG. 5A illustrates each of the eight bit products formed by multiplier circuits 90 (such as product $O_{10}O_{20}$, shown as reference number 110) in their mathematical positions. Each column formed by vertical dotted lines represents 4 bits of the output product of multiplier circuit 54, with the most significant bits on the left of FIG. 5A. By summing each of the eight bit products, left shifted to represent the appropriate powers of sixteen of the eight bit products, a 64 bit product 112 is formed.

Similarly, the two products of 16 bit operands are provided according to the following equation:

$$P_{16} = O_{17}O_{27}*16^{14} + O_{17}O_{26}*16^{13} + O_{17}O_{25}*16^{12} + O_{17}O_{24}*16^{11} +$$
$$O_{16}O_{27}*16^{13} + O_{16}O_{26}*16^{12} + O_{16}O_{25}*16^{11} + O_{16}O_{24}*16^{10} +$$
$$O_{15}O_{27}*16^{12} + O_{15}O_{26}*16^{11} + O_{15}O_{25}*16^{10} + O_{15}O_{24}*16^9 +$$
$$O_{14}O_{27}*16^{11} + O_{14}O_{26}*16^{10} + O_{14}O_{25}*16^9 + O_{14}O_{24}*16^8 +$$

-continued $$O_{13}O_{23} * 16^6 + O_{13}O_{22} * 16^5 + O_{13}O_{21} * 16^4 + O_{13}O_{20} * 16^3 +$$

$$O_{12}O_{23} * 16^5 + O_{12}O_{22} * 16^4 + O_{12}O_{21} * 16^3 + O_{12}O_{20} * 16^2 +$$

$$O_{11}O_{23} * 16^4 + O_{11}O_{22} * 16^3 + O_{11}O_{21} * 16^2 + O_{11}O_{20} * 16 +$$

$$O_{10}O_{23} * 16^3 + O_{10}O_{22} * 16^2 + O_{10}O_{21} * 16 + O_{10}O_{20}$$

Figure 5B:
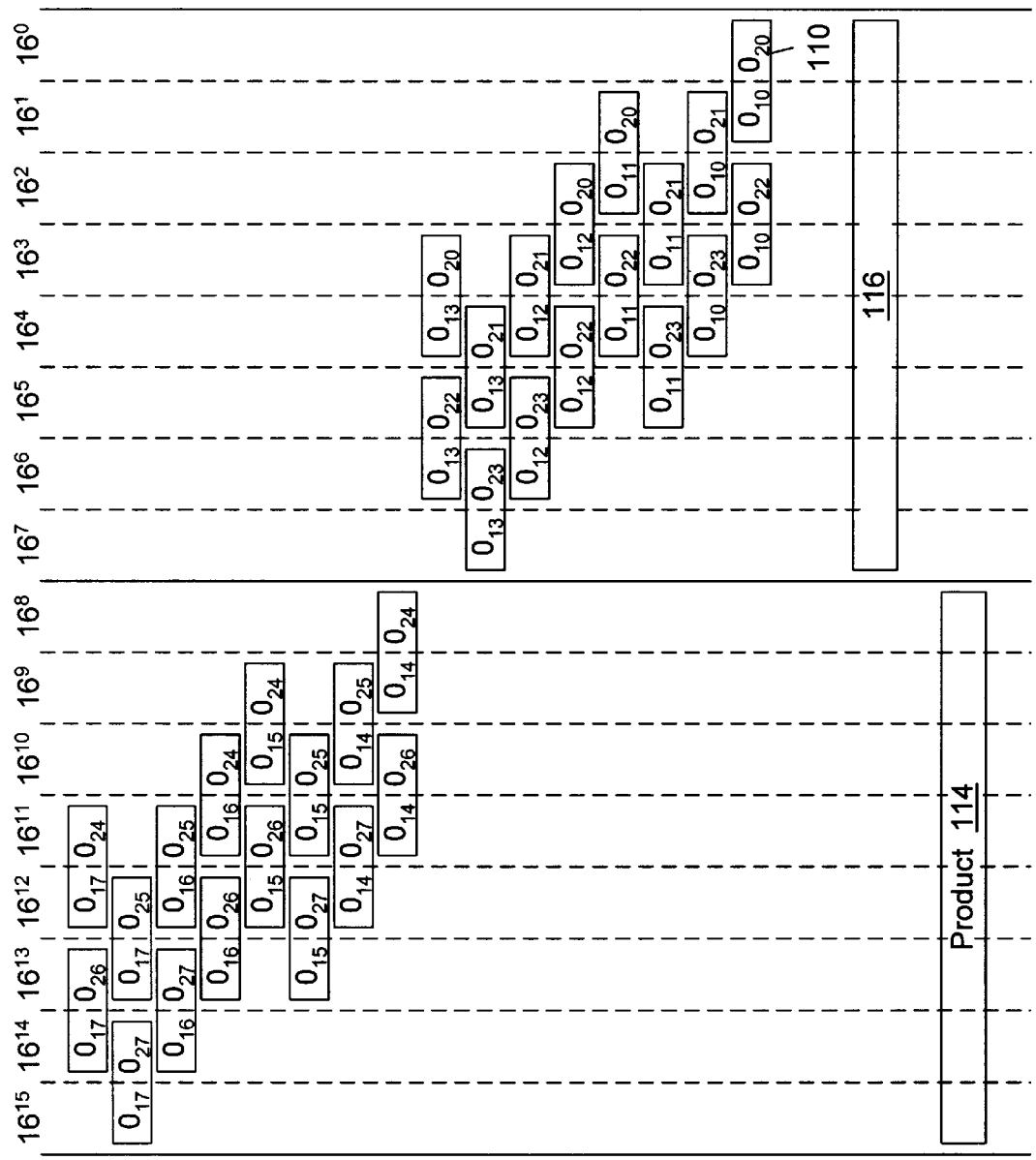
FIG. 5B is a diagram depicting two products of 16 bit operands.

In the $P_{16}$ equation, products of the four lowest order four bit quantities of one operand and the four highest order four bit quantities of the other operand are eliminated via assertion of the appropriate control signals 52. These products are eliminated because the four lowest order four bit quantities of each operand are interpreted according to the instruction to be executed as a first pair of 16 bit operands to be multiplied, and the four highest order four bit quantities of each operand are interpreted as a second pair of 16 bit operands to be multiplied independent of the first pair of 16 bit operands. The eliminated products multiply a portion of one of the first pair of operands by one of the second pair of operands. FIG. 5B depicts the output of multiplier circuit 54 when two pairs of 16 bit operands are operated upon. The solid vertical lines divide the 64 bit product into two 32 bit products 114 and 116. Product 114 is the sum of the products of the highest order sixteen bit quantities, while product 116 is the sum of the products of the low order sixteen bit quantities. As the solid vertical line between products 114 and 116 indicates, the products are independent even though formed using the same circuitry employed to produce product 112 shown in FIG. 5A.

Products of 8 bit operands and 4 bit operands are given as shown the $P_8$ and $P_4$ equations shown below:

$$P_8 = O_{17}O_{27} * 16^{14} + O_{17}O_{26} * 16^{13} + O_{16}O_{27} * 16^{13} + O_{16}O_{26} * 16^{12} +$$

$$O_{15}O_{25} * 16^{10} + O_{15}O_{24} * 16^9 + O_{14}O_{25} * 16^9 + O_{14}O_{24} * 16^8 +$$

$$O_{13}O_{23} * 16^6 + O_{13}O_{22} * 16^5 + O_{12}O_{23} * 16^5 + O_{12}O_{22} * 16^4 +$$

$$O_{11}O_{21} * 16^2 + O_{11}O_{20} * 16 + O_{10}O_{21} * 16 + O_{10}O_{20}$$

$$P_4 = O_{17}O_{27} * 16^{14} + O_{16}O_{26} * 16^{12} + O_{15}O_{25} * 16^{10} + O_{14}O_{24} * 16^8 +$$

$$O_{13}O_{23} * 16^6 + O_{12}O_{22} * 16^4 + O_{11}O_{21} * 16^2 + O_{10}O_{20}$$

Figure 5C:
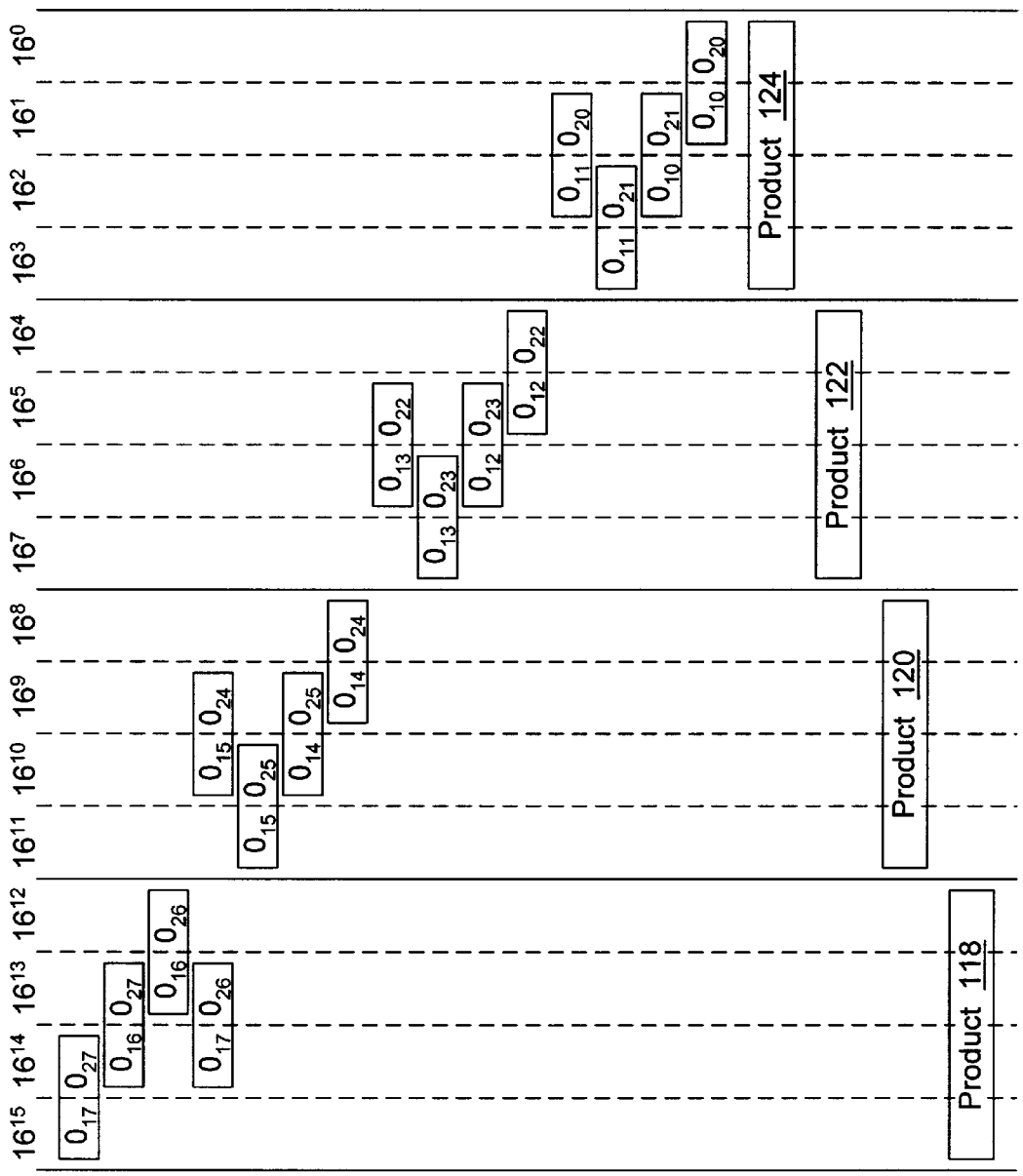
FIG. 5C is a diagram depicting four products of 8 bit operands.

Additional products are eliminated in transition from the $P_{16}$ equation to the $P_8$ equation, and still further products are eliminated in the transition from the $P_8$ equation to the $P_4$ equation. The $P_8$ equation represents four independent 16 bit products formed from pairs of eight bit operands conveyed upon first operand bus 42 and second operand bus 44. In particular, $O_{17}O_{16}$ and $O_{27}O_{26}$ comprise a pair of eight bit operands. Similarly, $O_{15}O_{14}$ and $O_{25}O_{24}$ comprise a pair of eight bit operands, $O_{13}O_{12}$ and $O_{23}O_{22}$ comprise a pair of eight bit operands, and $O_{11}O_{10}$ and $O_{21}O_{20}$ comprise a pair of eight bit operands. FIG. 5C depicts the 64 bit result conveyed from multiplier circuit 54 when 8 bit operands are selected by the decoded instruction. Products 118, 120, 122, and 124 are thereby formed.

Figure 5D:
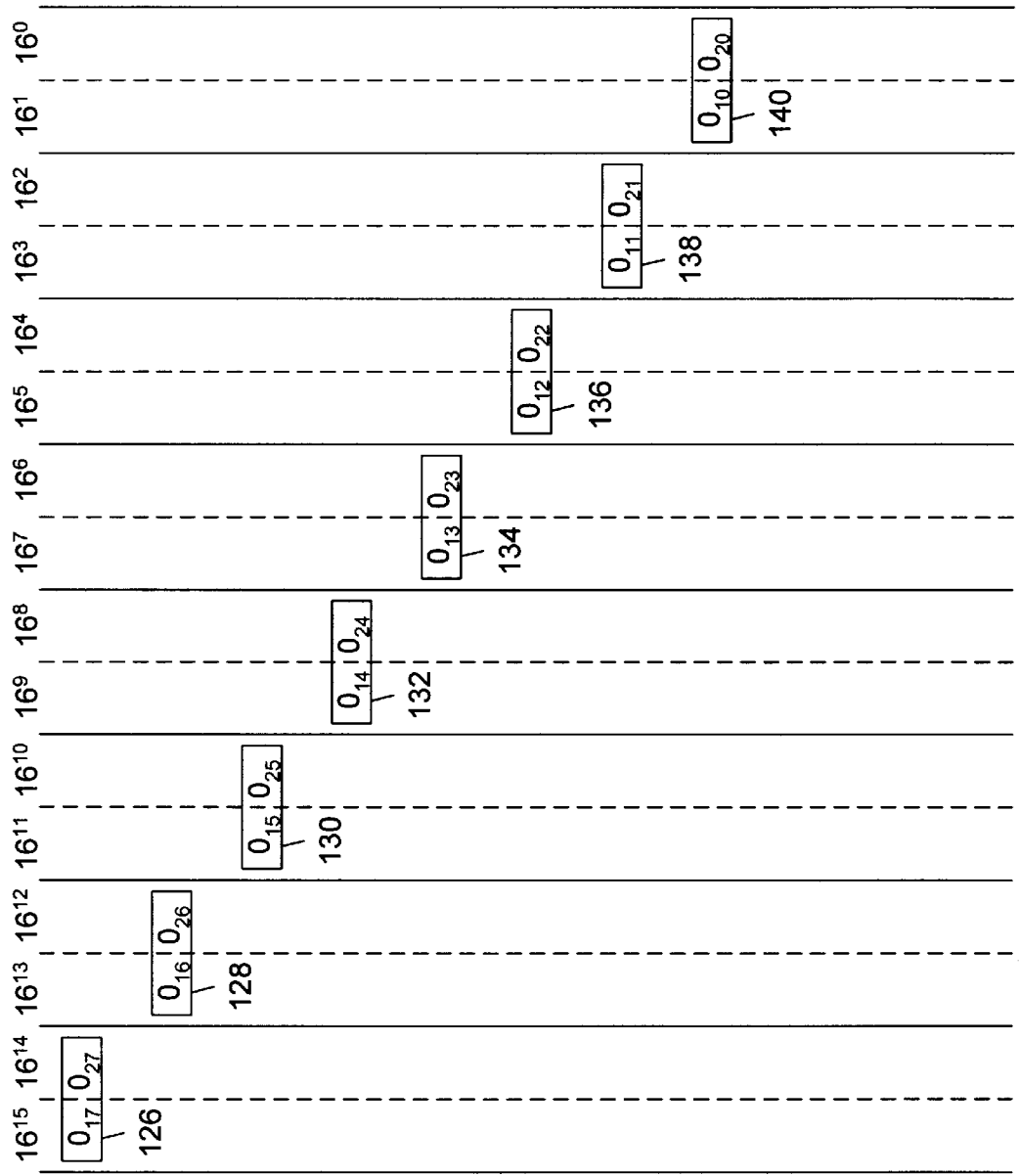
FIG. 5D is a diagram depicting eight products of 4 bit operands.

Finally, FIG. 5D depicts the situation in which eight 4 bit operands are selected by the decoded instruction. Eight 8 bit products are thereby conveyed, shown as products 126, 128, 130, 132, 134, 136, 138, and 140.

Although discussed with respect to FIG. 5 as four bit portions, multiplier circuit 54 may be configured to operate upon larger portions. For example, if eight bit portions are the narrowest operands of interest, multiplier circuit 54 may employ eight bit individual multiplier circuits 90 instead of four bit individual multiplier circuits. Any size individual multiplier circuits may be suitable for various embodiments of multiplier circuit 54. Furthermore, any size product may be conveyed by multiplier circuit 54. For example, equation $P_8$ may be rewritten as:

$$P'_8 = O_{17}O_{27} * N^{14} + O_{17}O_{26} * N^{13} + O_{16}O_{27} * N^{13} + O_{16}O_{26} * N^{12} +$$

$$O_{15}O_{25} * N^{10} + O_{15}O_{24} * N^9 + O_{14}O_{25} * N^9 + O_{14}O_{24} * N^8 +$$

$$O_{13}O_{23} * N^6 + O_{13}O_{22} * N^5 + O_{12}O_{23} * N^5 + O_{12}O_{22} * N^4 +$$

$$O_{11}O_{21} * N^2 + O_{11}O_{20} * N + O_{10}O_{21} * N + O_{10}O_{20}$$

where "N" is the number of bits represented by each $O_{xx}$. As with adder circuit 50, multiplier circuit 50 may be configured to perform a mix of operand sizes. For example, two pairs of 8 bit operands maybe conveyed in the four lowest order four bit quantities, while a pair of 16 bit operands are conveyed in the four highest order four bit quantities. Additional multiplication flexibility is available if, instead of inserting zeros for individual multipliers which are deleted from a particular product, the individual multipliers may receive additional input operands. For example, a 32 bit multiplier which uses 4 bit individual multiplication circuits includes 64 such individual multiplication circuits. Therefore, 64 individual 4 bit multiplications (producing 8 bit products) may be performed.

It is noted that, although arithmetic circuits have been shown as examples herein, logical circuits may be similarly modified to allow operation upon a single wide operand or multiple independent narrow operands. For example, a barrel shifter may be configured to barrel shift a 32 bit operand, two independent 16 bit operands, four independent 8 bit operands, two independent 8 bit operands and a 16 bit operand, etc.

Figure 6:
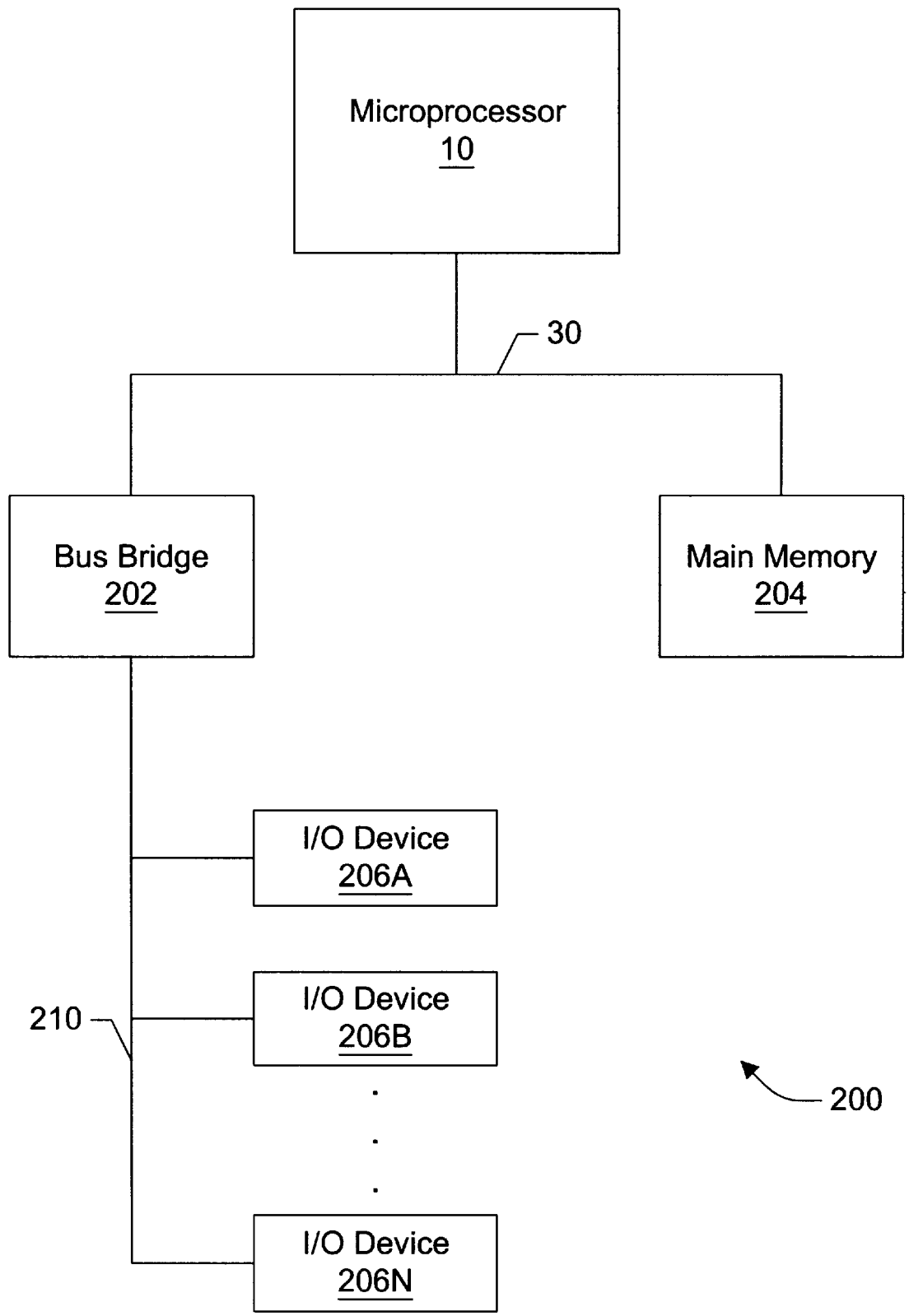
FIG. 6 is a block diagram of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 30. I/O devices 206 are coupled to an I/O bus 210 for communication with bus bridge 202.

Bus bridge 202 is provided to assist in communications between I/O devices 206 and devices coupled to system bus 30. I/O devices 206 typically require longer bus clock cycles than microprocessor 10 and other devices coupled to system bus 30. Therefore, bus bridge 202 provides a buffer between system bus 30 and input/output bus 210. Additionally, bus bridge 202 translates transactions from one bus protocol to another. In one embodiment, input/output bus 210 is an Extended Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 30, or may reside on system bus 30 in a "lookaside" configuration.

It is noted that the above discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, an execute unit configured to execute an integer operation upon operands comprising one or more values of varying widths is disclosed. Advantageously, operations for which narrower width operands are sufficient and which exhibit parallelism may be expedited by performing multiple operations in parallel in an execute unit which may only perform one wide-width operand operation. Performance of operations upon narrower width operands may be enhanced by the parallel performance of multiple operations. By employing flexible integer operation circuits, a comparatively small amount of silicon area may be consumed by the circuitry.

Numerous variations and modifications will become apparent to those skilled in the art once the above disclosure is fully appreciated. It is intended that the following claims be interpreted to embrace all such variations and modifications.

What is claimed is:

1. A method of operating a first integer operation circuit and a second integer operation circuit, comprising:
    performing an integer operation upon a first operand and a second operand in said first integer operation circuit, thereby producing a first result;
    performing said integer operation upon a third operand and a fourth operand in said second integer operation circuit, thereby producing a second result; and
    modifying said second result using a circuit if a control signal from a control unit is deasserted, such that said first result and said second result comprise a third result indicative of performing said integer operation upon a fifth operand comprising said first and third operands and a sixth operand comprising said second and fourth operands, and wherein said first result and said second result are independent if said control signal is asserted;
    said control unit receiving an instruction corresponding to said first operand, said second operand, said third operand, and said fourth operand, and selectively asserting or deasserting said control signal in response to said instruction.

2. The method as recited in claim 1 wherein said integer operation is addition.

3. The method as recited in claim 1 wherein said integer operation is multiplication.

4. The method as recited in claim 3 further comprising
    performing a multiplication of said first operand and said fourth operand, thereby producing a fourth result;
    performing a multiplication of said second operand and said third operand, thereby producing a fifth result; and
    combining said first, second, fourth and fifth results to produce a sixth result indicative of performing said integer operation on said fifth and sixth operands.

5. The method as recited in claim 1 further comprising
    performing at least one additional integer operation in at least one additional integer operation circuit, each additional integer operation being performed upon two additional operands, thereby producing an additional result;
    modifying said additional result using said circuit if an additional control signal from said control unit is deasserted, such that said additional result and said third result comprise a fourth result indicative of performing said integer operation upon a seventh operand comprising said first and third operands and one of said additional operands and an eighth operand comprising said second and fourth operands and another of said additional operands, and wherein said additional result is independent of said first result and said second result if said additional control signal is asserted.

6. An execute unit comprising:
    a first circuit configured to perform an integer operation upon a first operand and a second operand, thereby producing a result; and
    a control unit coupled to said first circuit, wherein said control unit is coupled to receive an instruction corresponding to said first operand and said second operand, and wherein said control unit is configured to assert a control signal if said instruction indicates that a first portion of said result is computed independent of a second portion of said result, and wherein said first portion of said result comprises said integer operation applied to a first portion of said first operand and a first portion of said second operand, and wherein said second portion of said result comprises said integer operation applied to a second portion of said first operand and a second portion of said second operand, and wherein said control unit is configured to deassert said control signal if said instruction indicates that said result comprises said integer operation applied to said first operand and said second operand;
    wherein said first circuit comprises:
        a first integer operation circuit configured to perform said integer operation upon said first portion of said first operand and said first portion of said second operand, thereby producing said first portion of said result;
        a second integer operation circuit configured to perform said integer operation upon said second portion of said first operand and said second portion of said second operand, thereby producing said second portion of said result; and
        a second circuit configured to modify said second portion of said result upon deassertion of said control signal to produce said result comprising said integer operation applied to said first operand and said second operand.

7. The execute unit as recited in claim 1 wherein said first circuit further comprises a third integer operation circuit and a fourth integer operation circuit; wherein said third integer operation circuit is configured to perform said integer operation upon a third portion of said first operand and a third portion of said second operand, thereby producing a third portion of said result; and wherein said fourth integer operation circuit is configured to perform said integer operation upon a fourth portion of said first operand and a fourth portion of said second operand, thereby producing a fourth portion of said result.

8. The execute unit as recited in claim 6 wherein said first circuit further comprises at least one additional integer operation circuit; and wherein said at least one additional integer operation circuit is configured to perform said integer operation upon at least one additional portion of said first operand and at least one additional portion of said second operand, thereby producing at least one additional portion of said result; and wherein one of said first, second and additional portions of said results has a size dissimilar to a size of another of said first, second and additional portions of said results.

9. The execute unit as recited in claim 7 wherein said control unit is configured to assert an additional control signal to said first circuit, wherein said additional control signal is indicative, when asserted, that said first portion of said result and said second portion of said result are combined to produce a second result and said third portion of said result and said fourth portion of said result are combined to produce a third result.

10. The execute unit as recited in claim 7; wherein said control unit is configured to assert a second control signal to said first circuit, wherein said second control signal is indicative, when asserted, that said first portion of said result and said second portion of said result are combined to produce a second result; and wherein said control unit is configured to assert a third control signal to said first circuit, wherein said third control signal is indicative, when asserted, that said third portion of said result and said fourth portion of said result are combined to produce a third result; and wherein said second control signal and said third control signal can be asserted independent of each other and independent of said control signal.

11. The execute unit as recited in claim 9 further comprising a third circuit coupled to receive said additional control signal, wherein said third integer operation circuit is configured to receive a third carry operand representing a carry into said addition, and wherein said third circuit is configured to supply said third carry operand.

12. The execute unit as recited in claim 11 wherein said third circuit is configured to supply a zero if said additional control signal is asserted.

13. The execute unit as recited in claim 11 wherein said second integer operation circuit is configured to supply a fourth carry operand indicative of a carry out of said addition.

14. The execute unit as recited in claim 13 wherein said third circuit is configured to supply said fourth carry operand as said third carry operand if said additional control signal is deasserted.

15. An execute unit comprising:
   a first circuit configured to perform an integer operation upon a first operand and a second operand, thereby producing a result; and
   a control unit coupled to said first circuit, wherein said control unit is coupled to receive an instruction corresponding to said first operand and said second operand, and wherein said control unit is configured to assert a control signal if said instruction indicates that a first portion of said result is computed independent of a second portion of said result, and wherein said first portion of said result comprises said integer operation applied to a first portion of said first operand and a first portion of said second operand, and wherein said second portion of said result comprises said integer operation applied to a second portion of said first operand and a second portion of said second operand, and wherein said control unit is configured to deassert said control signal if said instruction indicates that said result comprises said integer operation applied to said first operand and said second operand;
   wherein said first circuit comprises:
   a first integer operation circuit configured to perform said integer operation upon said first portion of said first operand and said first portion of said second operand, thereby producing said first portion of said result;
   a second integer operation circuit configured to perform said integer operation upon said second portion of said first operand and said second portion of said second operand, thereby producing said second portion of said result; and
   a second circuit configured to modify said second portion of said result upon deassertion of said control signal to produce said result comprising said integer operation applied to said first operand and said second operand wherein said integer operation is multiplication.

16. The execute unit as recited in claim 15 wherein said second circuit is an adder circuit configured to receive said second portion of said result from said second integer operation circuit.

17. The execute unit as recited in claim 16 further comprising a third integer operation circuit configured to produce a second result comprising a multiplication of said first portion of said first operand and said second portion of said second operation.

18. The execute unit as recited in claim 17 further comprising a third circuit coupled to said third integer operation circuit and said second circuit, said third circuit configured to select between said second result and a zero result, thereby producing a selected result, wherein said third circuit provides said selected result to said second circuit.

19. The execute unit as recited in claim 17 wherein said second circuit is configured to add said selected result to said second portion of said result, whereby said second portion of said result is provided if said zero result comprises said selected result.

20. A method for performing reconfigurable additions, the method comprising:
   performing a first integer operation upon a first portion of a first operand and a first portion of a second operand in a first integer operation circuit, thereby producing a first result;
   performing a second integer operation upon a second portion of said first operand and a second portion of said second operand in a second integer operation circuit, thereby producing a second result;
   selectively propagating a portion of said first result from said first integer operation circuit to said second integer operation circuit in response to a deassertion of a first control signal by a control unit, wherein said selectively propagating includes propagating a zero value to said second integer operation circuit in response to an assertion of said control signal;
   said control unit receiving an instruction, said instruction corresponding to said first and second operands, and responsively controlling the assertion or deassertion of said control signal, wherein said assertion of said control signal induces independent integer operations of corresponding portions of said first operand and said second operand, wherein deassertion of said control signal induces a composite integer operand on said first operand and said second operand.

21. The method of claim 20, wherein said first integer operation circuit and said second integer operation unit comprise adders, wherein said portion of said first result is a carry out signal from said first integer operation circuit.

22. The method of claim 21 comprising:

performing a plurality of integer operations in a corresponding plurality of integer operation circuits, wherein each of the integer operation circuits operates on corresponding portions of said first operand and said second operand;

selectively propagating to each integer operation circuit a zero value of a carry out value from the previous integer operation circuit in response to a corresponding control signal;

said control unit controlling the assertion and deassertion of said control signals in response to said instruction;

said integer operation circuits generating a plurality of results.

23. A method for performing reconfigurable multiplications, the method comprising:

performing a first multiplication of a first portion of a first operand and a first portion of a second operand in a first multiply circuit, thereby generating a first low order result;

performing a second multiplication of a second portion of said first operand and a second portion of said second operand in a second multiply circuit, thereby generating a first high order result;

computing a second low order result and a second high order result using said first operand and said second operand;

generating an intermediate low order value by selectively adding said first low order result to (a) said second low order result or (b) a zero value, in response to the value of a first control signal;

generating an intermediate high order value by selectively adding said first high order result to (a) said second high order result or (b) a zero value, in response to the value of a second control signal;

said control unit receiving an instruction corresponding to said first and second operands and responsively controlling the values of said control signals, wherein assertion of said first control signal and said second control signal induces an independent multiplication of corresponding portions of said first operand and said second operand.

24. The method of claim 23, wherein said computing a second low order result includes performing a third multiplication of said first portion of said first operand and said second portion of said second operand in a third multiply circuit, and said computing of said second high order result comprises performing a fourth multiplication of said second portion of said first operand and said first portion of said second operand.

25. The method of claim 24 further comprising adding said intermediate low order value and said intermediate high order value to generate an output value, wherein said output value comprises independent results of multiplying separate portions of said first operand and said second operand when said first control signal and said second control signal are asserted by said control unit.

* * * * *

UNITED STATES PATENT AND TRADEMARK OFFICE

CERTIFICATE OF CORRECTION

PATENT NO. : 6,092,094

DATED : July 18, 2000

INVENTOR(S) : Mark A. Ireton

It is certified that error appears in the above-identified patent and that said Letters Patent is hereby corrected as shown below:

Claim 7, col. 16, line 57, please change "claim 1" to "claim 6".

Signed and Sealed this

Tenth Day of April, 2001

Attest:

NICHOLAS P. GODICI

Attesting Officer

Acting Director of the United States Patent and Trademark Office